Jan. 1, 1935.   P. B. RENFREW   1,986,162
LIQUID DISPENSING APPARATUS
Filed Feb. 23, 1932   5 Sheets-Sheet 1

Inventor:
Paul B. Renfrew
By Cheever, Cox + Moore
Attys.

Jan. 1, 1935. P. B. RENFREW 1,986,162
LIQUID DISPENSING APPARATUS
Filed Feb. 23, 1932 5 Sheets-Sheet 4

Inventor:
Paul B. Renfrew
By Cheever, Cox & Moore
Attys.

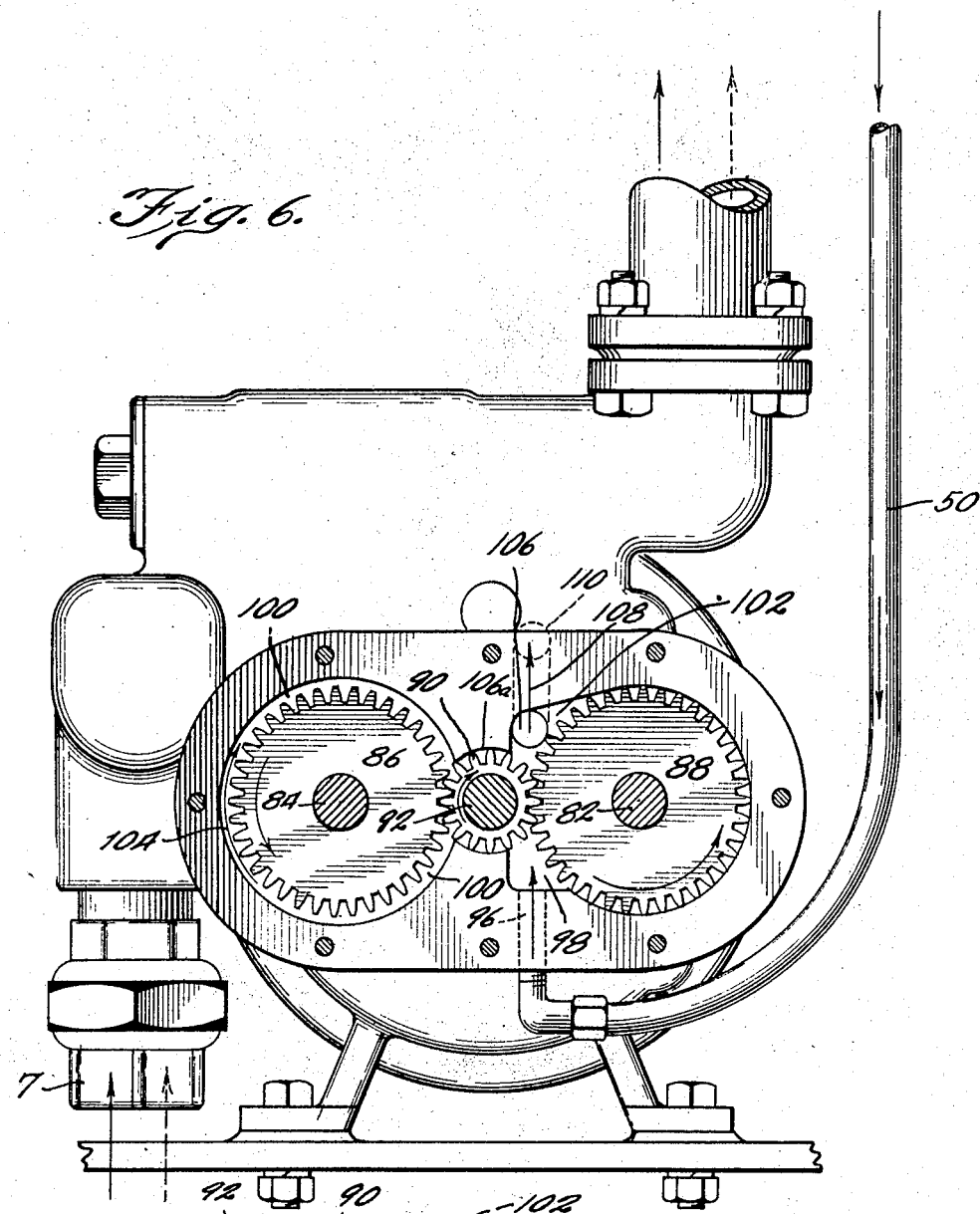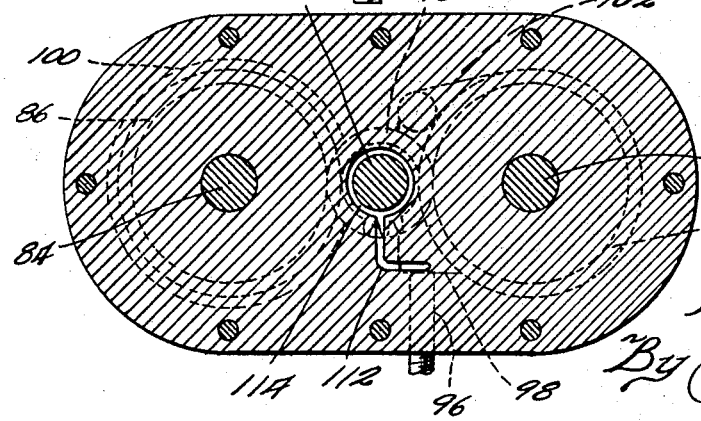

Patented Jan. 1, 1935

1,986,162

UNITED STATES PATENT OFFICE 1,986,162

LIQUID DISPENSING APPARATUS

Paul B. Renfrew, Fort Wayne, Ind.

Application February 23, 1932, Serial No. 594,596

12 Claims. (Cl. 221—95)

My invention relates to liquid dispensing devices, and particularly to means for removing the air and objectionable gases from the liquid prior to its reaching the meter.

While I have shown my device as adapted particularly to gasoline dispensing mechanisms, it is to be understood that it is capable of use in any adaptation wherein it is desired to remove objectionable air and gases from the liquid.

In the adaptation of my device to gasoline dispensing systems, particularly to dispensing devices provided with a meter, or other device for recording the amount of liquid passing through the dispensing nozzle, the gasoline is generally drawn from a supply tank and pumped through a pipe connecting with the meter; from the latter it flows generally through a sight glass and thence through the flexible hose which terminates in the dispensing nozzle. The nozzle is generally provided with a manually operated valve. In these systems it is desirable to remove air and other volatiles from the liquid prior to the time that the liquid reaches the meter, whereby to prevent imperfect measurement of the amount of liquid flow. These devices are generally arranged between the discharge end of the pump and the entrance side to the meter so that liquid flowing from the pump to the meter has the air separated therefrom.

One of the objects of my present invention is to provide an improved type of air separator arranged so that the undesirable air in the liquid, when it passes from the pump to the meter, is separated out, and passed to the atmosphere, while at the same time, any gasoline or other liquid which attempts to escape with the discharged air is prevented from so escaping and is carried back to the discharge side of the pump, and in a manner so as not to affect the vacuum on the suction side of the pump.

Another object of my invention resides in providing an air separating means connected to the discharge side of the pump which is adapted to pass the liquid to the meter and is adapted simultaneously and continuously to separate the air therefrom, and conducts said air to the atmosphere while at the same time preventing any liquid from passing with said air to the atmosphere by providing a separate pump for positively returning any liquid attempting to escape with the separated air back to the discharge side of the pumping means whereby the capacity of the main pump is not affected, and whereby any possible connection between the suction side of the main pump and the atmosphere is eliminated, and whereby such escaping gasoline is returned in a positive manner to the gasoline line.

These and other objects of my invention will be apparent from a perusal of the following specification when taken in connection with the accompanying drawings wherein Fig. 1 is a view partly in section of the lower part of a gasoline dispensing unit;

Fig. 6 is a section taken on line 6—6 of Fig. 4, and

Fig. 7 is a view showing the manner of preventing leakage past the pump shaft bearing.

Figure 3:
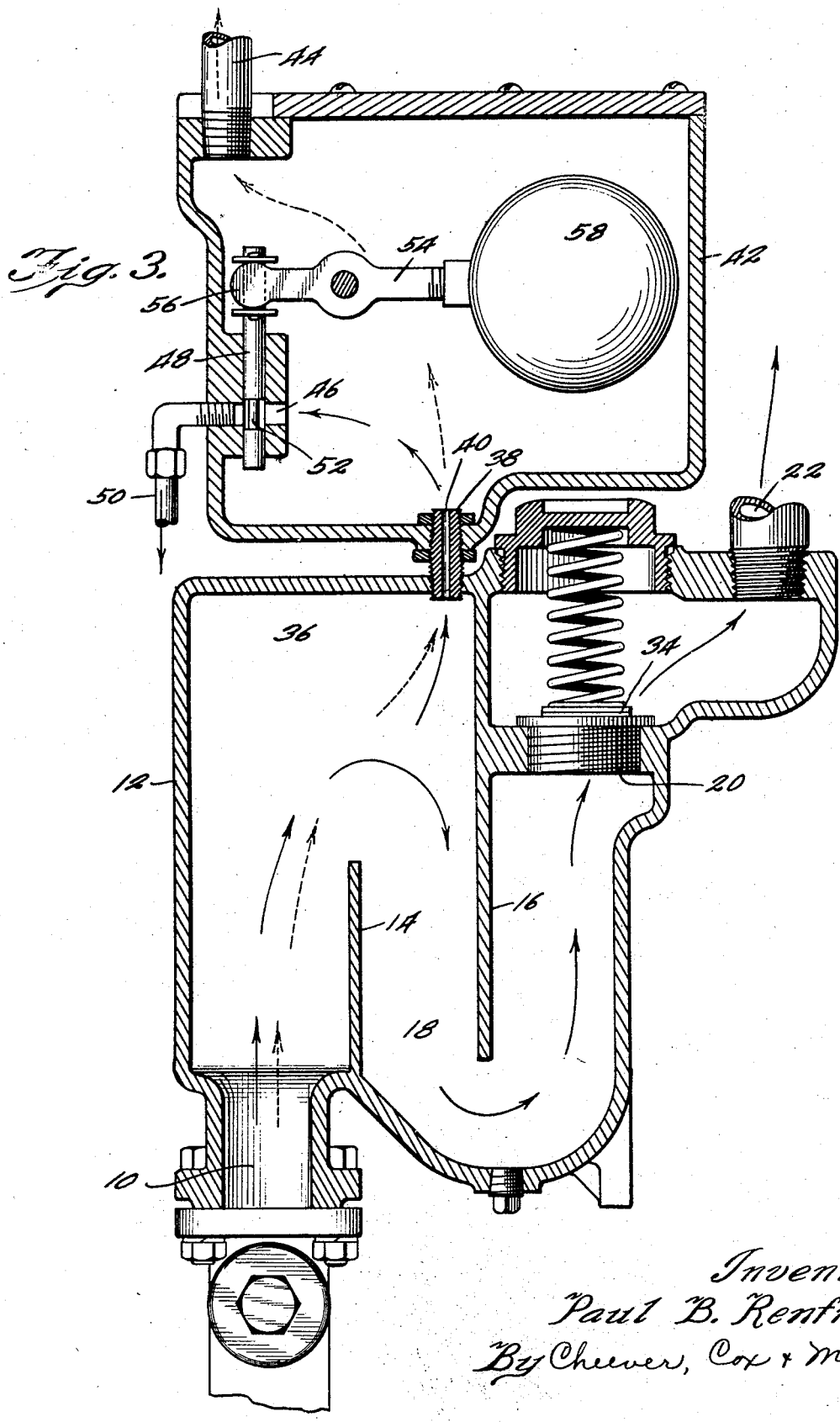
Fig. 3 is a cross section of a part of the air separating device.

Referring to the drawings I have shown a gasoline dispensing device comprising a base 2 and a housing 4. Within this housing is mounted a pump 6 having its inlet or suction side 7 connected to a reservoir or supply tank not shown. This supply tank is generally operated or placed beneath the ground level, although not necessarily so. The pump 6 is driven by a motor 8 through belt connections 9 and is adapted to force the liquid from the discharge side of the pump through a pipe 10 through an air separator comprising a casing 12. In the present instance, this air separator is constructed to provide an upstanding flange 14 and a reversely disposed depending flange 16 spaced therefrom so as to provide a gasoline passage 18. The main body of gasoline, forced by the pump, will pass into the casing 12, thence over the flange 14 and through the passageway 8, thence under the flange 16 through valve port 20, thence out through pipe 22 to the meter 24, from which point it is discharged through pipe 26 to the sight glass 28, thence through the flexible discharge hose 30 out through the valve control nozzle 32. The spring-pressed check-valve 34 shown in Fig. 3 is for the purpose of holding the sight-glass cylinder 28 at all times full of gasoline. This spring is arranged to yield under the force of the pump 6 to permit the passage of gasoline to the meter.

Figure 2:
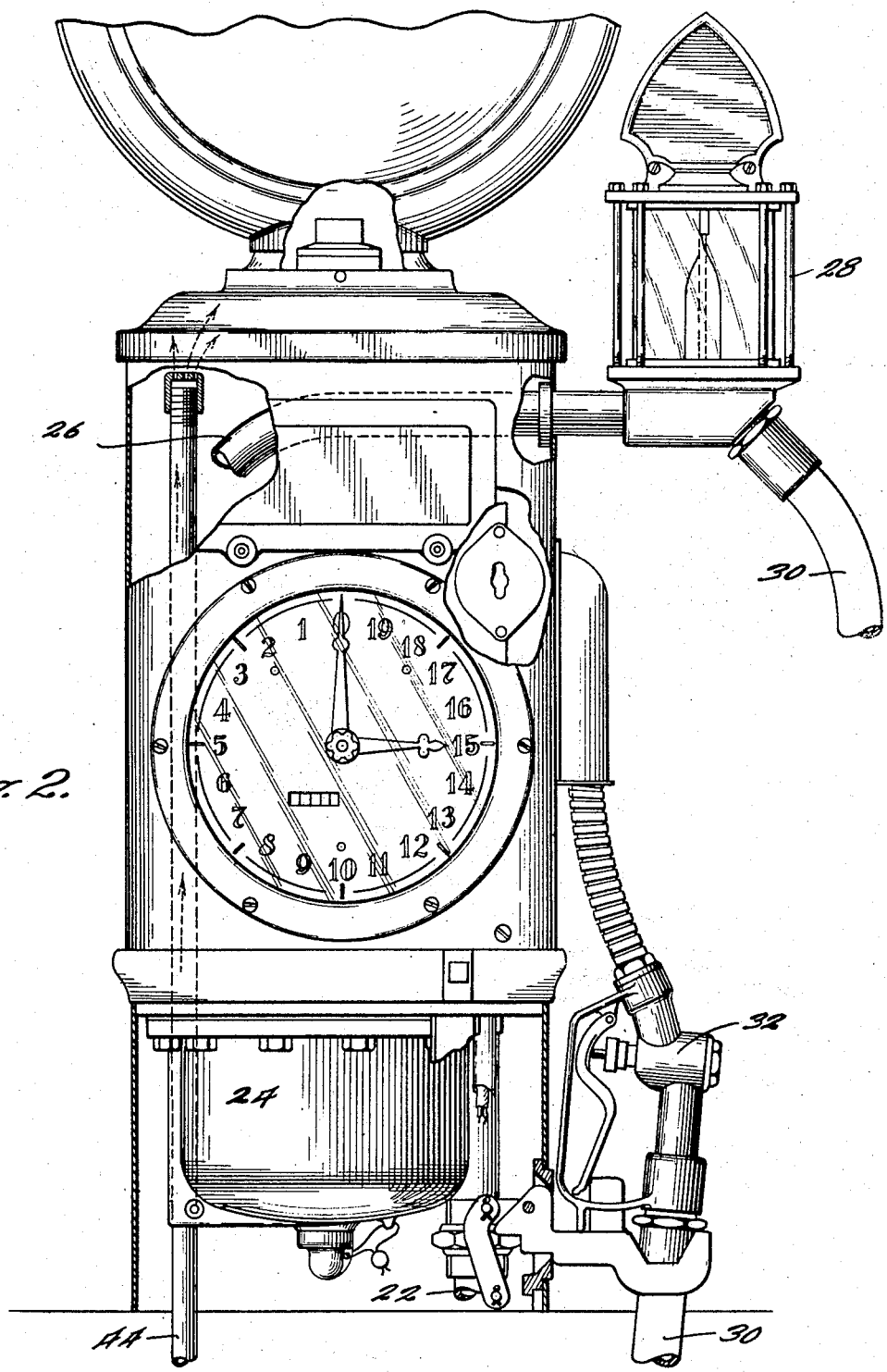
Fig. 2 is a similar view of the upper portion thereof.

The air separating casing 12 with its internal, spaced-apart upstanding and depending partitions 14 and 16 is so arranged to provide a space 36 above the normal flow of gasoline through the passageway 18 formed by such partitions, whereby air or volatiles which are in the gasoline or pass through the pipe 10 from the pump are adapted to be separated out. In this manner a substantial part of the air which passes through the pipe 10 along with the gasoline is separated therefrom prior to the passage of the gasoline through the passage 18, the check valve 34 and the pipe 22 to the meter. The top of the casing 12 above the space 36 is provided with a restricted orifice in the form of a nipple 38 having restricted passage 40 therethrough, which is adapted to discharge into a separate chamber 42, the upper portion of which is connected by means of a relatively long pipe 44 to the atmosphere. As shown in Fig. 2, this pipe extends preferably upwardly within the housing 4, and is open to the atmosphere at the top of the housing so that any gasoline fumes discharged to the atmosphere along with the air are discharged within the top of said housing. The casing 42 is provided with a gasoline or liquid discharge 46 having a plunger valve 48. This port 46 is connected by means of pipe 50 to a second pump about to be described. The valve 52 formed on the plunger 48 and associated with a port 46 is operated by means of a lever 54 having its outer end forked as at 56 to embrace the upper end of the plunger 48. The other end of the lever 54 is provided with a ball float 58 adapted to be actuated by the level of the liquid in the chamber 42.

Figure 1:
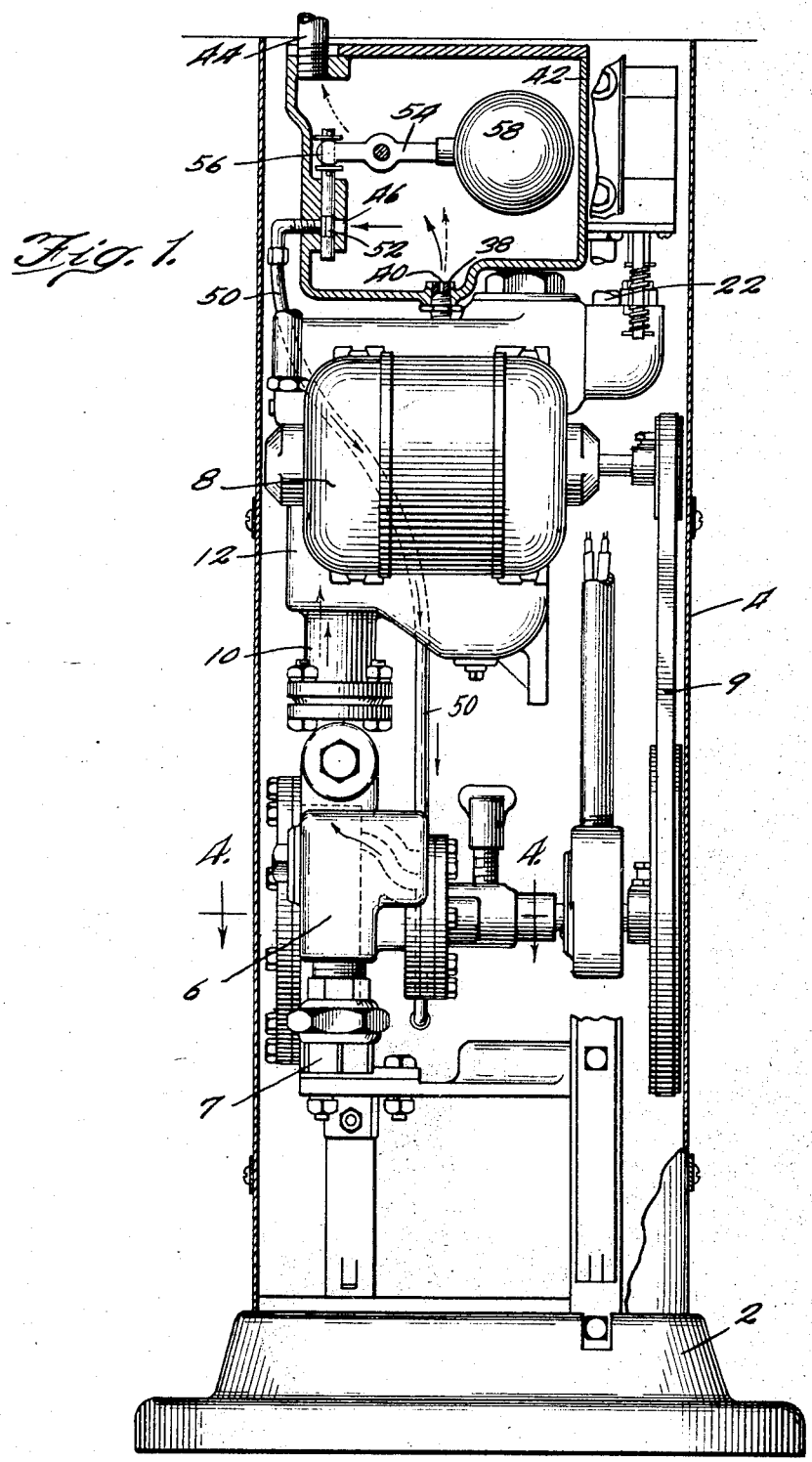

The main pump 6 of Fig. 1 is of any ordinary type. In the present instance I have illustrated a type of pump comprising a casing 60 having a gasoline inlet 7, and having an internal passage 62 through which the liquid, as indicated by the arrows 64 and 66, passes into an internal chamber 68. This chamber is divided by means of an internal center partition 70 and cooperating with this partition is a shiftable displacer 72 having connections 74 and 76 with two eccentrics 78 and 80 driven by means of shafts 82 and 84 from the two gears 86 and 88, which gears in turn are driven by an intermediate gear 90 on a shaft 92. This shaft in turn is driven by belt 9 from the motor 8. Inasmuch as the details of construction of this type of pump are not herein new, except in the manner in which it is adapted to cooperate with the other elements of my device, I will make no further description of the device, except to say that upon movement of the displacer 72, the liquid is drawn into the central chamber 68 and is forced outwardly thereby through the pump discharge outlet 94 from whence it is passed to the pipe 10 shown in Fig. 3.

In my present invention I provide means for positively pumping the gasoline or other liquid from the float controlled chamber 42 when the valve 52 is moved to open position, down through pipe 50. This pipe 50, as shown clearly in Fig. 6 of the drawings, has its discharge side 96 emptying into a chamber 98, which is formed between the gears 90 and 88.

The gear 86 is provided between it and the enclosing wall with a circumferentially arranged chamber 100 by which arrangement, as the teeth of gears 88 and 90 roll apart and enter the chamber 98, the interdental spaces fill with the liquid. On gear 88 this liquid carried in the interdental spaces, is carried around between the teeth and the periphery of the casing, and forced out into chamber 102 as the teeth of the gear 88 again come into contact with the teeth of gear 90.

Figures 4, 5:
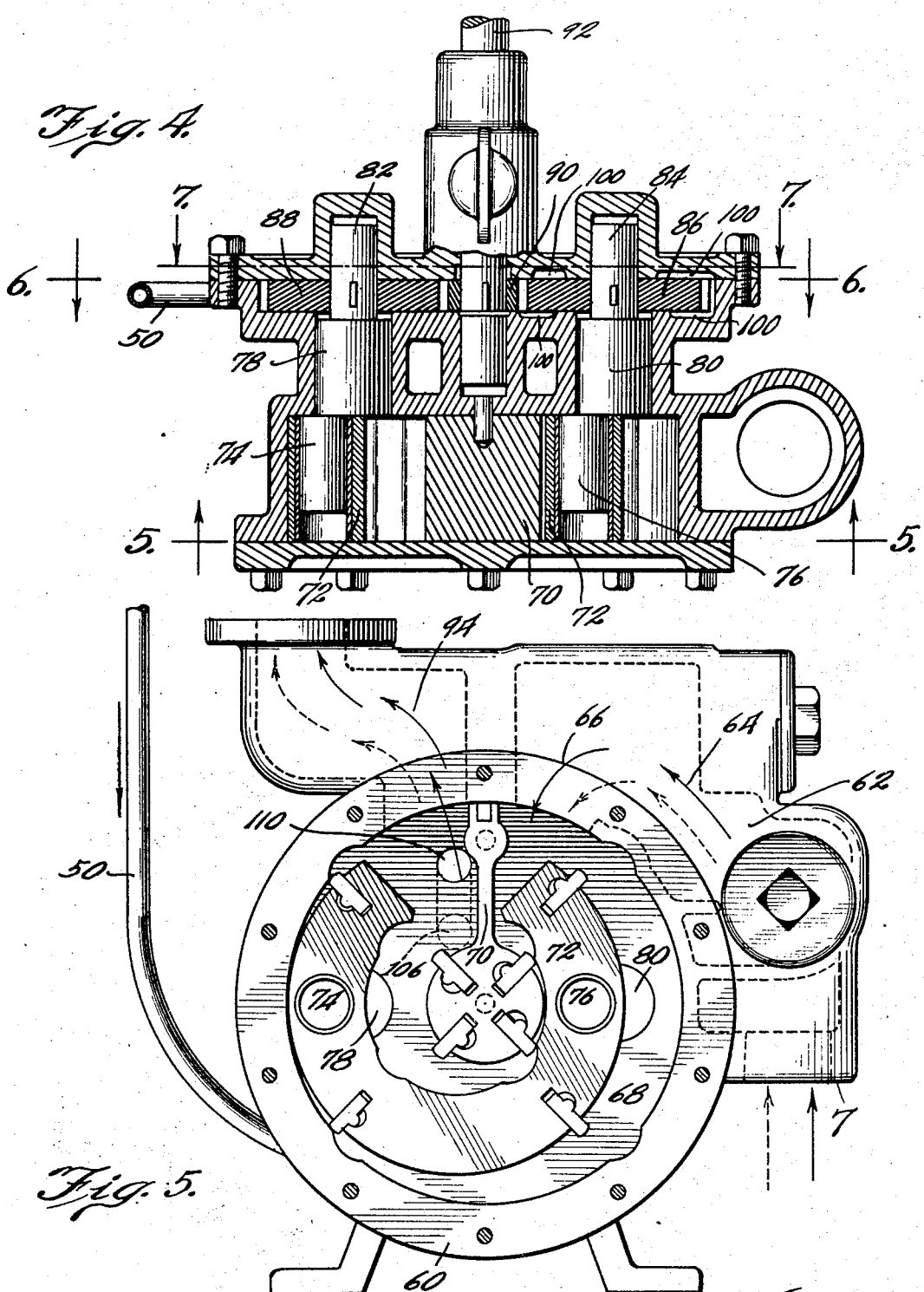
Fig. 4 is a section on line 4—4 of Fig. 1 of the gasoline pump.
Fig. 5 is a section taken through line 5—5 of Fig. 4.

In connection with gear 90, as the teeth thereof leave the teeth of gear 88, the spaces are filled with liquid from the cavity or chamber 98 and this liquid is carried along until the teeth of gear 90 mesh with the teeth of gear 86 at which point the oil in the interdental spaces of gear 90 is discharged into the passageway 100, surrounding gear 86. This liquid is then carried as shown by the arrow 104 completely around and is then deposited in the interdental spaces of gear 90, which is rotating in a clockwise direction, the liquid is then carried past the seal 106a and deposited into the chamber 102 from which point it is forced outwardly through port 106 in the direction of the arrow 108, to port 110, which, as shown in Fig. 5, empties into the discharge side of the pump. From this point the pump forces this liquid through the passage 94, thence through passageway 10 into the air release 12. The gear 86 is arranged so that it does not fit tightly in its bore, i. e., it has clearance on both sides of its periphery and side faces to provide this oil carrying passageway 100.

In the modified construction, gears 86 and 90 can also have displacement if the meshing point of the teeth therebetween were ported to cavity 106 and the passageway 100 were ported to cavity 98, and further, if the circumferential passageway 100 were eliminated and if the gear 86 fitted into a bore like the gear 88, however, such modification would not be as commercially successful because of the complicated porting.

I also provide means for providing a leakproof stuffing box for the gear mechanism of my pump. This is accomplished by connecting the suction port chamber 98 by means of a passage 112 leading to a passage 114 circumferentially surrounding the shaft stuffing box as shown in Fig. 7. It will be readily appreciated that the vacuum created in the chamber 98 at the suction side of gears 88 and 90 will tend to produce a suction or vacuum through the passageway 112, which connects to the passageway 114 on the stuffing box, which suction would tend to pull air into the pump lines and force gasoline out.

In lieu of utilizing the gears 86, 88 and 90 of the main pump as a pumping means as hereinbefore described, it will be understood that my device will function equally as well with a distinct or separate pump from that shown in Fig. 5, said separate pump being used to draw the supply from the pipe 50 from the float chamber and discharge the same at the discharge side of the main pump.

In the operation of my improved device, when the pump is put into operation, the gasoline is drawn from the source of supply and is forced through pipe 10 into the air release 12 and the air and a portion of the liquid passes through the orifice 40 into the float chamber while the main body of liquid passes through passageway 18 and out through pipe 22 to the meter. The air and gasoline entering the float chamber is sprayed, the air rising to the top, passes through pipe 44 upwardly through such standpipe to the atmosphere. The gasoline, being heavier, settles to the bottom of the float chamber and when this gasoline reaches a certain height, it raises the float 58 and opens the valve permitting the gasoline to be drawn from the float chamber positively by the secondary pump. This secondary pump then discharges the gasoline to the discharge side of the primary pump. It will thus be apparent that by means of my improved device the vacuum producing qualities of the primary or main pump shown in Fig. 5 are not in any way influenced by the fact that the float chamber shown in Fig. 3 is vented as at 44 to the atmosphere, whereby if the float 58 and its valve 48 should stick in open position, the fact that pipe 50 is continuously in direct communication with the atmosphere would have no effect upon the vacuum producing qualities of the main pump. Furthermore, the capacity of the main pump is not reduced, due to the recirculation of the liquid passing into the float chamber, because this liquid is handled by a separate pump, which pump discharges into the discharge of the main pump. Another advantage resides in the fact that the liquid in the main chamber 42 is discharged therefrom by positive means rather than depending upon gravity to return this liquid to the system.

Furthermore, since the vacuum produced by the main liquid forcing pump is sometimes dependent upon the conditions of installation and as a result of which the existing vacuum conditions may vary considerably due to differences in height of lift, and particularly where the main liquid moving pump operates under a float suction due to the fact that the supply tank is located on a hill, or is located slightly above the level of the pump, my improved device is operative under all circumstances, since a separate pump is utilized.

Having thus fully described my invention, what I claim as new and desire to obtain by Letters Patent is:

1. In a dispensing apparatus, the combination of a pump adapted to connect with a liquid supply reservoir and having a discharge port, an air and liquid separator connected with the discharge port of said pump, said separator having a liquid discharge port and an air discharge port, means connected with said air discharge port for separating any liquid passing through said air discharge port, said means communicating with the atmosphere, and a second pump connected with said means for drawing the liquid therefrom, said second pump being adapted to discharge liquid into the path of the liquid discharge port from the first pump.

2. In an apparatus of the class described, in combination with a pump adapted to draw liquid from a reservoir, an air and liquid separator, and a dispensing nozzle, a liquid flow line connecting the pump with the air and liquid separator, and a liquid discharge line from the liquid separator to the nozzle, means for passing air separated from the liquid in the separating means to the atmosphere and for pumping any liquid tending to escape with said air to the liquid flow line, and means for preventing the passage of liquid in reverse direction through said last named means.

3. A liquid dispensing system comprising liquid measuring means, a dispensing nozzle, means for pumping liquid to be dispensed from a reservoir through said measuring means and to said dispensing nozzle, means interposed between said pumping means and said measuring means for withdrawing a portion of said liquid and also air, and means for passing the air to the atmosphere and for pumping the liquid to the system at a point located in advance of said measuring means, said returning means including devices for preventing the passage of liquid in the reverse direction through said returning means.

4. A liquid dispensing system comprising liquid measuring means, a dispensing nozzle, means for pumping liquid to be dispensed through said measuring means and to said dispensing nozzle, means interposed in advance of said measuring means for withdrawing a portion of said liquid and also air, means for passing the air to the atmosphere, and additional pumping means for returning the liquid to the system at the discharge side of said first pumping means.

5. In a liquid dispensing system, the combination of a liquid dispensing line adapted to be connected to a reservoir, a dispensing nozzle, and a pump for passing liquid through the dispensing line to the dispensing nozzle, means disposed between the pump and the dispensing nozzle for withdrawing a portion of the liquid and also air, means for passing the air to the atmosphere, and means including a second pump for returning said withdrawn liquid to the system.

6. In a liquid dispensing system, the combination of means forming a dispensing line adapted to connect with a source of liquid, a meter, a pump for passing liquid through said dispensing line to the meter, and means disposed in the line in advance of the meter for withdrawing air and a portion of liquid from said line and recirculating it back to the line in advance of the point from which it is withdrawn, said last named recirculating means including a second pump, and means for passing the withdrawn air to the atmosphere.

7. In a device of the class described, the combination of means forming a dispensing line adapted to connect with a reservoir and including a meter discharging into a dispensing nozzle, an air separator disposed in said line in advance of the meter, a pump for passing liquid to the air separator, said air separator having a liquid discharge connected to the meter, a chamber disposed above the air separator and connected thereto by a restricted passage, said chamber having an air pipe at its upper portion adapted to be connected to the atmosphere and having a second pipe disposed below the air pipe, a valve controlling the liquid discharge through said second pipe, a float for operating said valve, a second pump, said second pipe connecting to the intake side of the second pump, said discharge side of said second pump being adapted to discharge into said air separator.

8. In a device of the class described, the combination with a dsipensing housing, a pipe therein adapted to have a connection at its bottom to a liquid reservoir, a pump connected to said pipe and mounted at the bottom of and within said housing, a second pump mounted adjacent said first pump, an air release mounted within said housing and having an inlet connection to the discharge port of said first pump, said air release including a chamber having a valved liquid discharge connection, a second chamber above said air release, a restricted connection between the top of said first chamber and said second chamber, a meter above said second chamber, said meter having an inlet connection connected to the liquid outlet of said air release, a sight glass mounted adjacent the top of said housing, a liquid connection from the outlet of said meter to said sight glass, a flexible hose connection to receive the discharge of said sight glass, said second chamber having an air pipe at its upper portion extending upwardly toward the top of said housing, and being open to the atmosphere thereat, said second chamber having a float-controlled liquid outlet and a pipe connecting said liquid outlet to the inlet of said second pump, said second pump having a liquid outlet communicating with the inlet of said air release.

9. An apparatus of the class described comprising a liquid dispensing line including an air and liquid separator having an air discharge port liquid pumping and a liquid discharge port, mechanism for passing liquid to said air and liquid separator, means for separating liquid from the air passing through said air discharge port, said means having a port communicating with the atmosphere, and a liquid recovery means communicating with said separating means and including additional liquid pumping mechanism for positively returning the recovered liquid to the liquid dispensing line.

10. In a liquid dispensing device for gasoline, the combination of a liquid flow line including pumping means, an air separator, having its inlet communicating with the discharge of said pumping means, said air separator including a main liquid outlet and a secondary liquid and air outlet, a chamber communicating with said secondary outlet, a pipe connecting with the top of said chamber and open to the atmosphere, said chamber having a liquid outlet, a float controlled valve for controlling said outlet, a meter connected to the main outlet of said air separator, said pumping means including shiftable liquid pumping member, at least two gears for rotating said member, a third gear meshing with said first mentioned gears, a shaft for said third gear, and means for rotating said gear; the liquid discharge from said chamber communicating with one side of the junction of one of said gears, and the third gear, and the opposite side of the zone of meshing between said gears being connected to the inlet to the air separator, said gears being formed as a liquid impelling pump.

11. In a liquid dispensing device, the combination of liquid measuring means adapted to discharge through a dispensing nozzle, a pump for forcing liquid through said measuring means to said nozzle, said pump including a liquid impelling member and gearing for operating the same, an air separator disposed in the liquid flow line between the pump and the liquid measuring means including means for passing air to atmosphere and for bypassing a portion of the liquid to the gearing of the pump, said gearing including means for forcing said liquid to the discharge side of said pump.

12. In a liquid measuring device, the combination of means forming a liquid flow line, a pump including a liquid impelling member for forcing liquid through the flow line, gearing for actuating said liquid impelling member, a motor for operating said gearing, said gearing being formed as a pumping means having a liquid inlet port and a liquid discharge port, connected with the liquid flow line, liquid measuring means in the liquid flow line to which liquid is pumped, and a dispensing line connected to the outlet of said liquid measuring means, air separating means disposed in the liquid flow line between the pump and the liquid measuring means and having a restricted orifice constantly connecting with the atmosphere, and a liquid return line connected to the inlet port of said gearing.

PAUL B. RENFREW.